US006968975B2

(12) United States Patent
Christensen

(10) Patent No.: US 6,968,975 B2
(45) Date of Patent: Nov. 29, 2005

(54) SELECTIVELY CASCADEABLE STORAGE MANAGEMENT APPARATUS, METHOD, AND SYSTEM

(76) Inventor: Coston L. Christensen, 1636 E. 450 S., Springville, UT (US) 84663-2926

( * ) Notice: Subject to any disclaimer, the term of this patent is extended or adjusted under 35 U.S.C. 154(b) by 208 days.

(21) Appl. No.: 10/603,886

(22) Filed: Jun. 25, 2003

(65) Prior Publication Data

US 2004/0262326 A1    Dec. 30, 2004

(51) Int. Cl.[7] ............................................. B65G 59/00
(52) U.S. Cl. ...................................... 221/298; 211/59.2
(58) Field of Search ........................ 221/131, 67, 298, 221/59.2, 124, 133, 281; 312/45; 211/59.2

(56) References Cited

U.S. PATENT DOCUMENTS

| | | | |
|---|---|---|---|
| 2,852,327 A | | 9/1958 | Mason .......................... 312/45 |
| 2,888,145 A | | 5/1959 | Knott et al. ................ 211/59.2 |
| 2,996,344 A | * | 8/1961 | Garman ........................ 312/45 |
| 4,289,254 A | * | 9/1981 | Spring ........................ 221/295 |
| 4,347,952 A | * | 9/1982 | Bookout ...................... 221/129 |
| 4,621,745 A | * | 11/1986 | Grace ........................... 221/75 |
| 4,911,309 A | * | 3/1990 | Stefan ........................ 211/59.2 |
| 5,335,818 A | * | 8/1994 | Maldanis et al. ............ 221/131 |
| D363,174 S | | 10/1995 | Fletcher, Sr. .................. D6/408 |
| 5,462,198 A | * | 10/1995 | Schwimmer ................ 221/130 |
| 5,706,978 A | * | 1/1998 | Spamer et al. .............. 221/298 |

\* cited by examiner

*Primary Examiner*—Kenneth Noland
(74) *Attorney, Agent, or Firm*—Steve McDaniel

(57) ABSTRACT

A selectively cascadeable storage unit allows a variable number of containers to be stored and dispensed in a first-in, first-out manner. The storage unit includes a receiving area, a storage track, a dispensing area, and a selectively engageable stop. The storage track conveys containers from the receiving area to the dispensing area, where the selectively engageable stop either holds the containers or passes the containers to a cascaded storage unit. In one embodiment, multiple storage units are substantially overlapped such that containers may be selectively passed from the dispensing area of one unit to the receiving area of the connected unit. The present invention facilitates better utilization of storage facilities and simplifies inventory management of a variety of containers such as barrels, bottles, boxes, cans, cartons, casks, crates, drums, jars, kegs, packages, sacks, tins, and tubs.

23 Claims, 13 Drawing Sheets

1000, 160

160a

160b

160c 1000, 160

160d 160e    160f 1100, 130

130a

130b 102
802

130c

102

SELECTIVELY CASCADEABLE STORAGE MANAGEMENT APPARATUS, METHOD, AND SYSTEM

BACKGROUND OF THE INVENTION

1. The Field of the Invention

The invention relates to the field of storage management devices, methods, and systems. Specifically, the invention relates to devices, methods, and systems for storing containers in a selectively cascadeable first-in, first-out manner.

2. The Relevant Art

Storage management of dated or perishable items such as food, part inventories, or the like is a process common to both private individuals and large organizations. Private individuals often store a supply of dated or perishable items such as food in case of an emergency. Businesses and other organizations often maintain a large inventory of parts with a limited shelf life. Since dated or perishable items may become obsolete or spoiled, individuals and organizations need storage management devices and methods for efficiently rotating inventories.

Dated or perishable items are commonly stored in containers such as cans or boxes. Storage management devices for containers such as cans or boxes often include a shelving system, which may further include devices that facilitate rotation of containers in a first-in, first-out ("FIFO") order, designed to prevent loss of dated or perishable items.

In some FIFO storage systems containers such as cans or boxes are placed onto a shelf and rolled down to a lower shelf until they are stopped at a dispensing area by a holding device. Subsequent containers inserted into the system roll down to the lower shelf until they are stopped by previous containers. FIFO storage systems allow containers to be removed from the shelves in the order that they were inserted, thereby preventing problems associated with using new containers before using old containers.

Some currently available FIFO storage systems include a set of shelf pairs, where the top shelf of a pair receives containers and the bottom shelf of the pair dispenses the containers. In some instances a shelf pair may be placed adjacent to or on top of another shelf pair, thereby creating a larger, modular storage unit.

One problem with two-shelf FIFO storage systems is that the shelf pairs have a limited capacity to store containers in a FIFO manner. When a shelf pair is full of containers containing a certain product, any new containers with that same product must be stored in another shelf pair. By storing containers holding the same products in multiple shelf pairs, the FIFO ordering of the containers is not preserved. Consequently, preventing the usage of new containers before using old containers becomes problematic.

Another type of currently available FIFO storage system offers a partial solution to this problem. Multiple shelves are cascaded, so that more than one shelf pair may be used to store containers holding the same products. Containers inserted into the top of a cascading shelf unit may roll down several shelves before reaching a dispensing area at the bottommost shelf. Cascaded FIFO storage systems are thus able to store greater numbers of containers than two-shelf FIFO storage systems.

One problem with cascading FIFO storage systems is that when a small number of containers are stored, a large amount of space is wasted. Such unused storage space cannot be used for other containers with different contents, because the other containers could not be retrieved until all of the first containers are retrieved.

What is needed are storage devices and methods that allow containers to be stored in a cascading, FIFO manner that also maximize storage space. Such a storage system would be selectively cascadeable, so that the amount of shelving used by a particular set of containers could be selected according to the number of containers that need to be stored. In particular, what is needed are devices and methods for selectively cascading FIFO storage containers for dated or perishable items so that a dynamically adjustable amount of space can be allocated for different sets of containers.

SUMMARY OF THE INVENTION

The various elements of the present invention have been developed in response to the present state of the art, and in particular, in response to the problems and needs in the art that have not yet been fully solved by currently available storage devices. Accordingly, the present invention provides an improved apparatus and method for storing and dispensing containers that overcomes many or all of the above-discussed shortcomings in the art.

In a first aspect of the invention, a storage unit for dispensing containers in a selectively cascading, FIFO manner includes a receiving area that receives containers and a dispensing area that provides containers. The storage unit further includes a storage track that conveys the containers from the receiving area to the dispensing area and a selectively engageable stop that either passes containers to another storage unit or holds the containers at the dispensing area. The selectively engagable stop increases the effectiveness of the present invention over the current art.

In order to pass or hold containers, the selectively engageable stop may be pivotally attached to the storage track, providing for rapid opening or closing of the stop. In certain embodiments, the selectively engageable stop may also be removable, permitting easy replacement of worn or damaged parts. Furthermore, the selectively engageable stop may be a slat, a panel, a pin, a latch, or the like.

The selectively engageable stop may also be electronically actuated. Electronic actuation provides mechanization to the storage unit. Mechanization may also be accomplished in other ways, such as resistively opening the selectively engageable stop in response to contact with a container. In certain embodiments, mechanisms for resistively opening the selectively engageable stop include spring-loaded devices and counterbalancing devices.

In certain embodiments, the storage track includes a receptor track member for conveying containers from the receiving area and a provider track member for conveying containers to the dispensing area. In one embodiment, a redirection member redirects containers from the receptor track member to the provider track member. In addition, at least one of the track members may be nearly horizontal. Track members may include shelves, filleted shelves, conveyer belts, rollers, and the like.

In one embodiment, the receiving area and the dispensing area are arranged such that the dispensing area of a first stacked storage unit substantially overlaps with the receiving area of a second stacked storage unit. In the aforementioned embodiment, the selectively engageable stop may redirect containers from the dispensing area to a storage track of the second storage unit. By cascading storage units, any desired number of containers may be stored in a FIFO manner.

The storage unit may further include one or more track height adjustment members useful for adjusting the positions of the track members within the storage unit. Track height adjustment members allow track members to be raised or lowered, allowing the storage unit to accommodate containers of several shapes and sizes. The track height adjustment members may also hold the track members at an incline, facilitating containers rolling or sliding on the storage tracks.

The storage track may be further configured to convey many types of containers, including barrels, bottles, boxes, cans, cartons, casks, crates, drums, jars, kegs, packages, sacks, tins, tubs, and the like. This versatility enables the storage unit to be used in a variety of applications, including home and commercial storage uses.

In another aspect of the present invention, a method for dispensing containers in a selectively cascading FIFO manner includes receiving a container on a storage track and selectively blocking the container with a selectively engageable stop to prevent the container from passing to a cascaded storage unit vertically aligned with the storage track. The method may also include selectively passing the container with a selectively engageable stop in order to pass the container to a lower storage track in the cascaded storage unit. The step of receiving a container on a storage track may be automated by using a mechanical device to guide placement of the container on the storage track. Automation in selectively passing or blocking a container may occur by electronic actuation of a stop, which may further include actuation of the stop in response to a button press or the like. In one embodiment, electronic actuation of the stop includes using a computer that selectively engages the stop from a central location, such as a storage management office within a warehouse.

The various elements and aspects of the present invention allow a more efficient use of storage space than currently available devices. In addition, the present invention reduces waste by dispensing older containers before dispensing newer containers. These and other features and advantages of the present invention will become more fully apparent from the following description and appended claims or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof, which are illustrated in the appended drawings. Understanding that these drawings depict only typical embodiments of the invention and are not therefore to be considered to be limiting of the scope of the invention, additional specificity and detail will be described and explained through the use of the accompanying drawings in which.

DETAILED DESCRIPTION OF THE INVENTION

Figure 1:
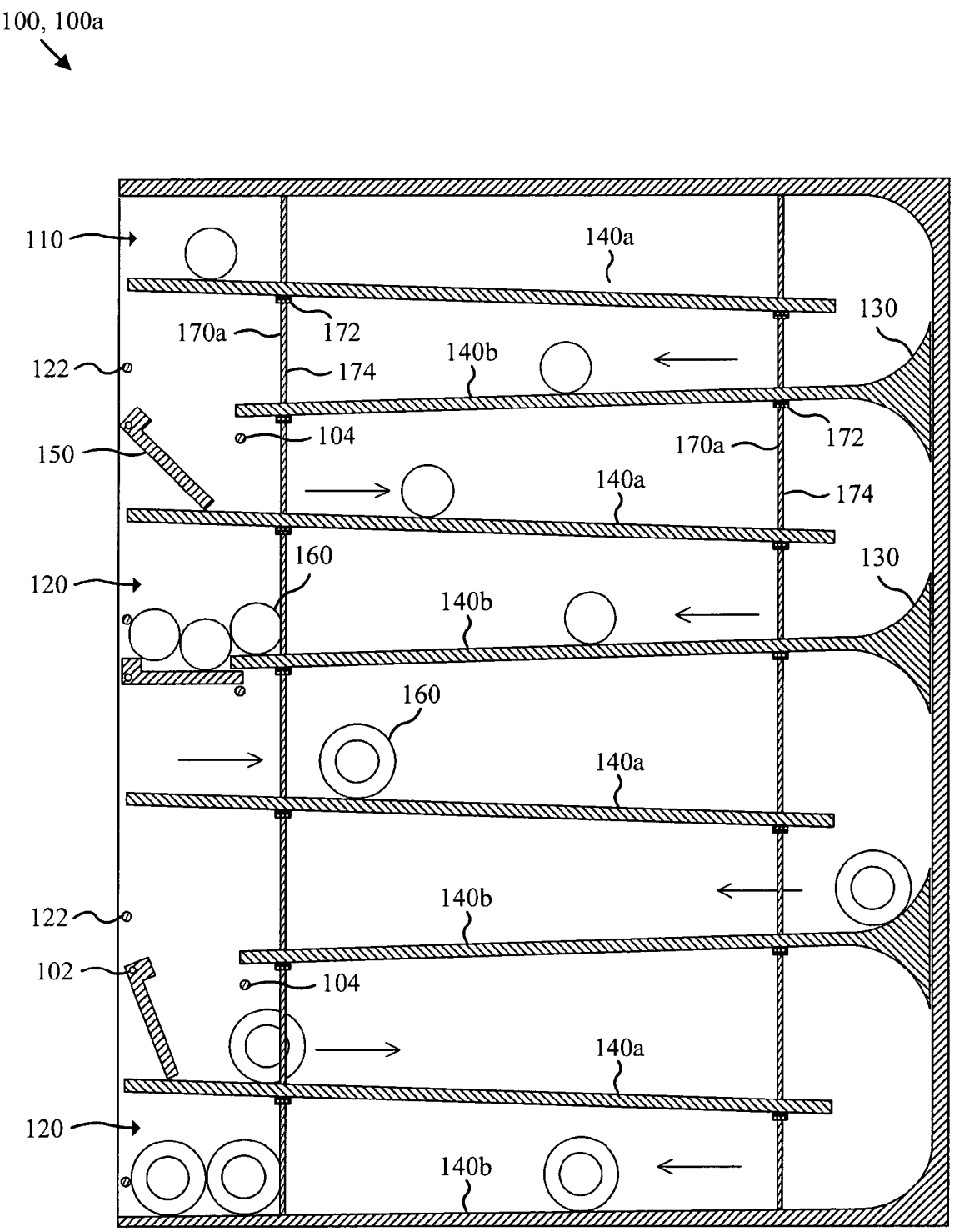
FIG. 1 is a side view illustration depicting one embodiment of a selectively cascadeable storage system of the present invention.
Figure 2:
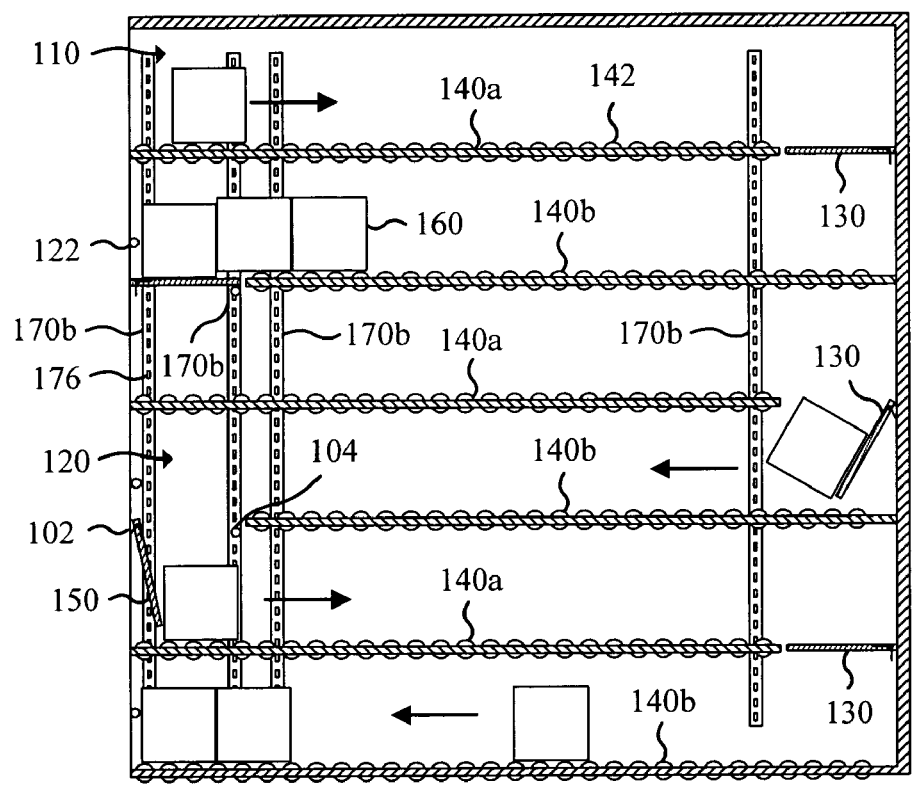
FIG. 2 is a side view illustration depicting one embodiment of a selectively cascadeable storage system of the present invention.

FIGS. 1 and 2 are perspective side view illustrations depicting certain embodiments of a selectively cascadeable storage system 100 of the present invention. The depicted embodiments of the selectively cascadeable storage system 100 include one or more hinge pins 102, engaging pins 104, receiving areas 110, dispensing areas 120, holding projections 122, redirection members 130, storage tracks 140, selectively engageable stops 150, containers 160, track height adjustment members 170, track support members 172, threaded rods 174, and adjustment holes 176. The selectively cascadeable storage system 100 facilitates storing and dispensing a plurality of containers in a FIFO manner.

FIG. 1 depicts a particular embodiment of the selectively cascadeable storage system 100, namely a selectively cascadeable shelving system 100a, wherein the storage tracks 140 comprise shelves. Likewise, FIG. 2 depicts a particular embodiment of the selectively cascadeable storage system 100, namely a selectively cascadeable roller system 100b, wherein the storage tracks 140 comprise rollers.

Rollers 142 in the selectively cascadeable roller system 100b facilitate moving non-cylindrical containers 160 such as boxes, sacks, and the like from higher storage tracks 140 to lower storage tracks 140. Other embodiments not depicted in FIGS. 1 and 2 may be easily derived by those of skill in the art to match the needs of a particular application.

In the depicted selectively cascadeable storage system 100, containers 160 are inserted into the receiving area 110, where they roll, slide, or are mechanically conveyed along the storage tracks 140. In the depicted embodiments the storage tracks 140 include a receptor track 140*a* and a provider track 140*b*.

A redirection member 130 directs the containers 160 from the receptor track 140*a* to the provider track 140*b*. The containers 160 then roll, slide, or are mechanically conveyed to the dispensing area 120, where the selectively engageable stop 150 either holds the containers 160 or passes the containers 160 to a lower receptor track 140*a*.

In one embodiment, the shortest distance between receptor tracks 140*a* and redirection members 130 is selected to be sufficiently large to pass containers of many sizes. For example, the distance may be selected to be greater than the diameter of a number 10 can. Furthermore, the shortest distance between a receptor track 140*a* and a provider track 140*b* nearest to the receptor track 140*a* may be large enough to allow containers of various sizes to pass through without impediment. In one embodiment, the aforementioned distance is at least ¼ inch greater than the diameter of the largest container 160 stored in the selectively cascadeable storage system 100.

If the selectively engageable stop 150 is engaged, the containers 160 are held at the dispensing area 120. If the selectively engageable stop 150 is not engaged, the containers 160 pass down to the receiving area 110 below the selectively engageable stop 150. The containers 160 continue to travel along the storage tracks 140 until they are held at a dispensing area 120 by an engaged selectively engageable stop 150.

The selectively engageable stop 150 causes the selectively cascadeable storage system 100 to be more customizable than currently available cascadeable FIFO storage systems. This customizability is achieved by selectively engaging the selectively engageable stops 150 so that a variable number of storage tracks 140 can be cascaded to hold either a small or large number of containers 160. By storing containers 160 in this manner, the selectively cascadeable storage system 100 achieves a high utilization of storage space.

As depicted in FIGS. 1 and 2, the selectively engageable stop 150 may pivot about a hinge pin 102 and the engagement pins 104 may be used to hold the selectively engageable stop 150 in an engaged position. A more detailed description of the functional relationship of one embodiment of the selectively engageable stop 150 with the hinge pin 102 and the engagement pins 104 will be provided in conjunction with FIGS. 4*a* and 4*b*.

In the depicted embodiments, one or more holding projections 122 positioned at the dispensing area 120 prevent the containers 160 from falling out of the selectively cascadeable storage system 100. The holding projections 122 may be pins, bars, blocks, rubber stops, or the like.

The storage track height adjustment members 170 facilitate adjusting the height of the storage tracks 140 to accommodate containers 160 of various sizes. Two embodiments of the track height adjustment members are depicted, namely track height adjustment members 170*a* shown in FIG. 1 and track height adjustment members 170*b* shown in FIG. 2.

As depicted in FIG. 1, the track height adjustment members 170*a* may include track support members 172 and threaded rods 174. A storage track 140 may rest on, or attach to, one or more track support members 172. In one embodiment, the track support members 172 may be turned about the threaded rods 174 to achieve a desired height and incline of the storage track 140 relative to other storage tracks 140. The track support members 172 may be metal, wooden, or plastic nuts, wing nuts, hand-tighten nuts, or the like.

As depicted in FIG. 2, the track height adjustment members 170*b* include several adjustment holes 176 to facilitate attaching storage tracks 140. Hooks or other similar fasteners (not shown) attach the storage tracks 140 to the track height adjustment members 170*b* by hooking into the adjustment holes 176 at selected locations to achieve a desired height and incline.

The relative heights of storage tracks 140 may be adjusted on the storage track height adjustment members 170 in order to fit containers 160 of various sizes onto the storage tracks 140. In addition, the incline angle of the storage tracks 140 may be adjusted on the storage track height adjustment members 170 to facilitate rolling or sliding of the containers 160 from higher storage tracks 140 to lower storage tracks 140.

Figure 3:
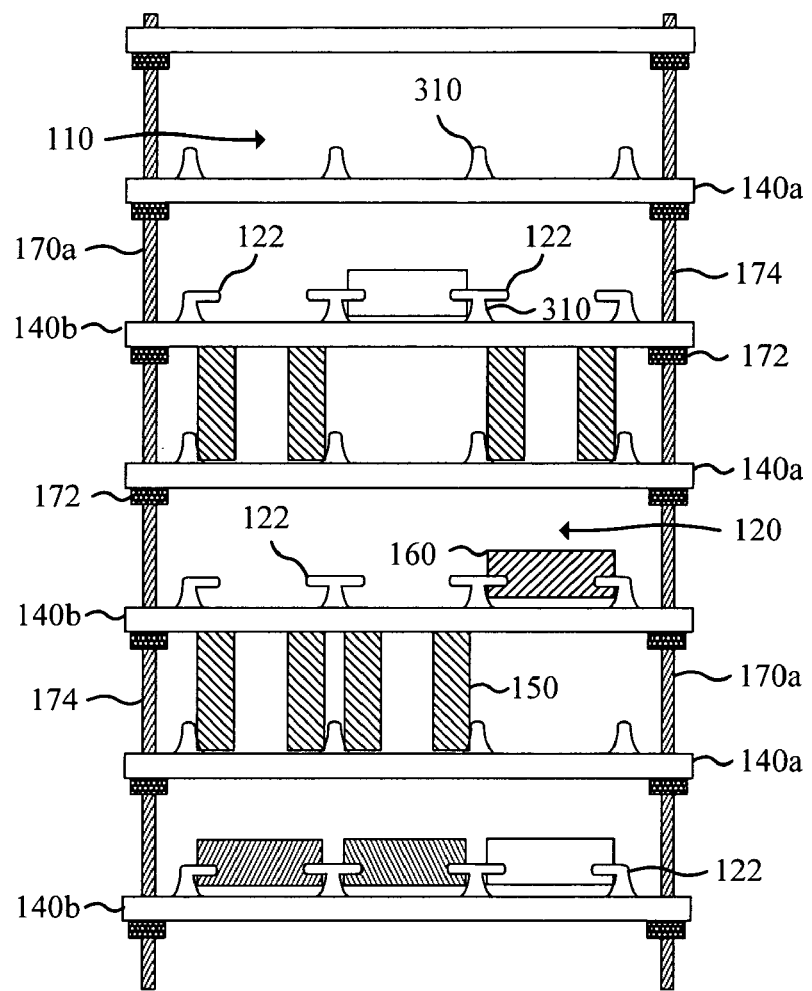
FIG. 3 is a front view illustration depicting one embodiment of a selectively cascadeable storage system of the present invention.

FIG. 3 is a front view illustration depicting one embodiment of a selectively cascadeable storage system 100 of the present invention, specifically a selectively cascadeable shelving system 100*c*. The depicted embodiment of the selectively cascadeable storage system 100 includes one or more receiving areas 110, dispensing areas 120, holding projections 122, storage tracks 140, selectively engageable stops 150, containers 160, track height adjustment members 170*a*, track support members 172, threaded rods 174, and fillets 310.

In the depicted embodiment, the holding projections 122 are attached to the fillets 310. The holding projections 122 and the fillets 310 may be produced with a single injection mold. Alternatively the holding projections 122 may be pins, bars, blocks, rubber stops, or the like. In another embodiment, one or more holding projections 122 may project upwards from the storage tracks 140.

The depicted fillets 310 feature a concave shape that forms a boundary for each storage track 140. Containers 160 rolling or sliding along the storage tracks 140 exclusively contact the concave surfaces of the fillets 310. Furthermore, the fillets may be shaped such that only the rims or outer edges of the containers 160 contact the fillets, such that the containers 160 travel on a low-friction surface.

As a result of the low-friction surface, fillets 310 enable the containers 160 to travel along the storage tracks quickly and easily, without impediment. Additionally, the low-friction travel of containers 160 allows the storage tracks 140 to be nearly horizontal and thereby reduces space consumed by storage tracks 140 positioned at steep incline angles.

Figures 4A, 4B:
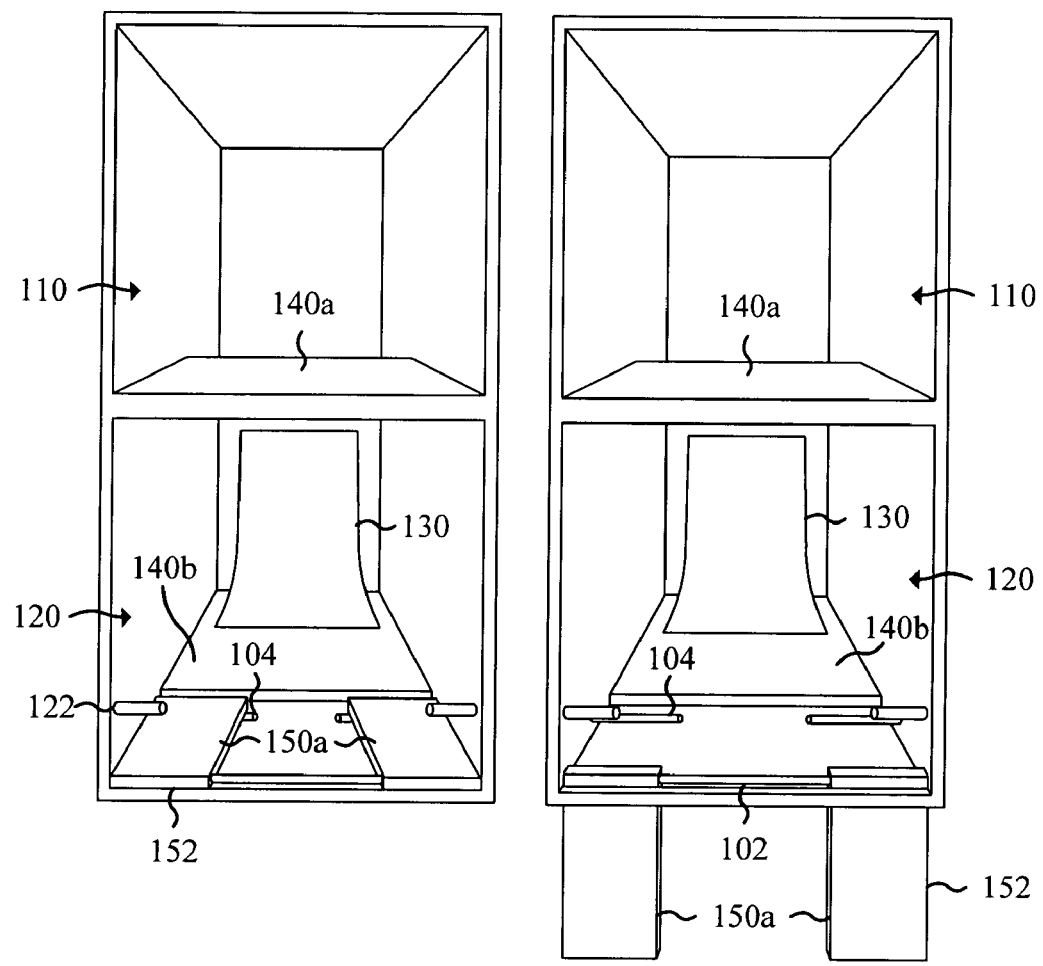
FIG. 4a is a perspective front view illustration depicting one embodiment of a selectively cascadeable storage unit of the present invention.
FIG. 4b is a perspective front view illustration depicting the selectively cascadeable storage unit of FIG. 4a, with a disengaged selectively engageable stop.
Figures 5A, 5B:
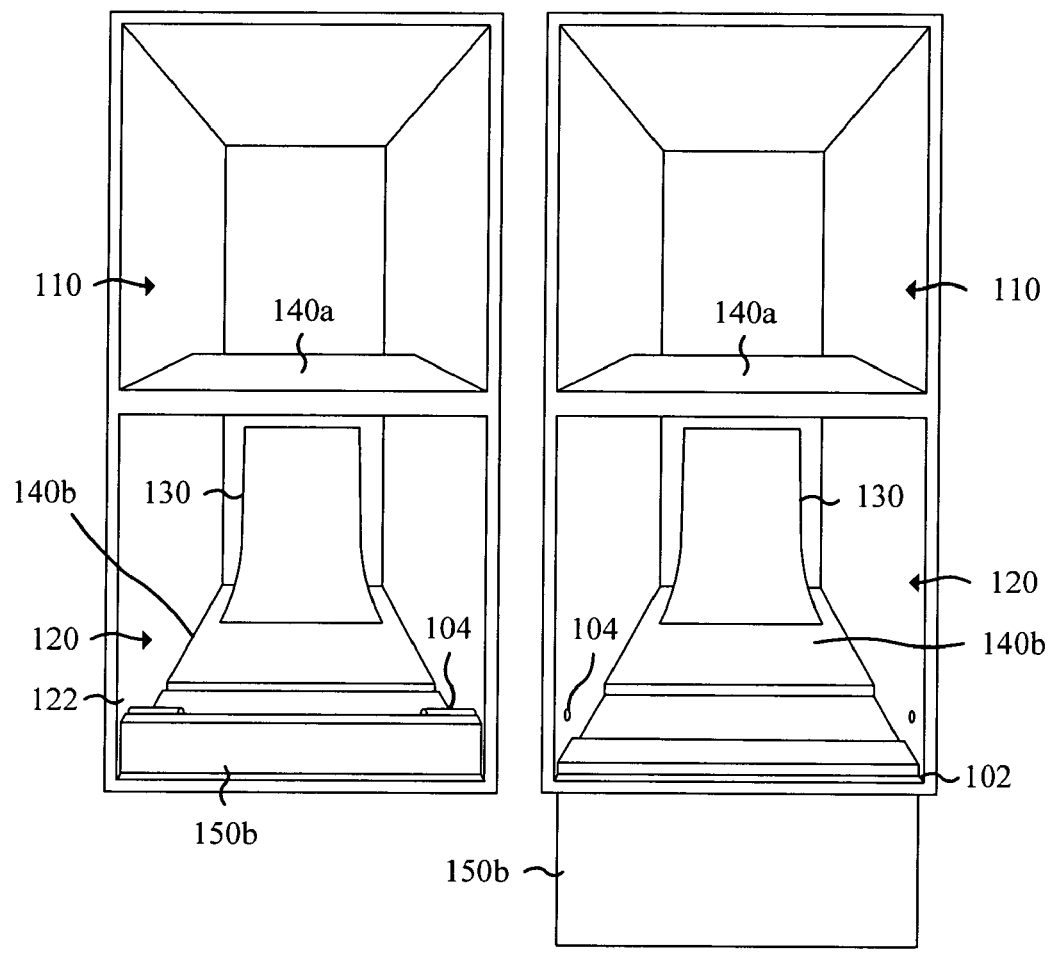
FIG. 5a is a perspective front view illustration depicting one embodiment of a selectively cascadeable storage unit of the present invention.
FIG. 5b is a perspective front view illustration depicting the selectively cascadeable storage unit of FIG. 5a, with a disengaged selectively engageable stop.

FIGS. 4*a* and 5*a* are perspective front view illustrations depicting selected embodiments of a selectively cascadeable storage unit 400 of the present invention, specifically the cascadeable storage unit 400*a* and the cascadeable storage unit 400*b*. FIGS. 4*b* and 5*b* are perspective front view illustrations depicting the selectively cascadeable storage unit 400 with a disengaged selectively engageable stop.

The depicted selectively cascadeable storage unit 400 includes a hinge pin 102, one or more engagement pins 104, a receiving area 110, a dispensing area 120, one or more holding projections 122, a redirection member 130, a storage track 140, and selected embodiments of a selectively engageable stop 150, namely a slat shaped stop 150*a* and a counterbalanced stop 150*b*. The slat stop 150*a* further includes one or more slats 152.

In the depicted embodiment the receiving area 110 is the entry point for a container to be placed on the storage track 140, which includes a receptor track 140*a* and a provider track 140*b*. The container rolls, slides, or is mechanically conveyed on the receptor track 140*a* from the receiving area 110 down to the provider track 140*b* with the aid of the redirection member 130. The container then rolls, slides, or is mechanically conveyed to the dispensing area 120, where the selectively engageable stop 150 either holds the container or passes it to a lower receptor track 140*a*.

At the dispensing area 120, the holding projections 122 prevent the container from falling out of the selectively cascadeable storage unit 400. Other pins, namely the hinge pin 102 and the engagement pins 104 hold the selectively engageable stop 150 in place. The engagement pins 104 facilitate holding the selectively engageable stop 150 in an engaged position, and the hinge pin 102 provides a pivot point about which the selectively engageable stop 150 may be turned to a disengaged position.

In one embodiment, the slats 152 of the slat stop 150*a* may slide towards the middle of the hinge pin 102, thereby allowing the slat stop 150*a* to disengage from the engagement pins 104. In another embodiment, the engagement pins 104 may be manually, mechanically, or electronically actuated to allow the selectively engageable stop 150 to disengage. When the selectively engageable stop 150 is disengaged as depicted in FIGS. 4*b* and 5*b*, the selectively engageable stop 150 may act as a ramp to facilitate passing containers to a lower storage track 140.

In certain embodiments, the slat stop 150*a*, hinge pin 102, and engagement pins 104 may be manufactured by injection molding, using plastic material or the like. In one embodiment, the hinge pin 102 is divided into two distinct sections, and each section is attached by molding into an injection molded provider track 140*b*. During disengagement of the slat stop 152, each slat 152 slides along a section of the hinge pin 102 until the slat 152 disengages from the hinge pin 102 and the engagement pin 104. Each slat 152 may then reattach to the hinge pin 102 to place the slat stop 150*a* in a disengaged position.

In one embodiment, the receptor track 140*a* and the provider track 140*b* are also manufactured by injection molding, using plastic material or the like. Injection molding provides lightweight storage tracks 140 that are easily coupled to form a modular unit. For example, in one embodiment the injection molded receptor track 140*a* may be stacked substantially on top of the injection molded provider track 140*b*, forming a selectively cascadeable storage unit 400. Moreover, the selectively cascadeable storage unit 400 may also be stacked upon another selectively cascadeable storage unit 400.

The selectively cascadeable storage unit 400 provides for oldest stored containers to be held at the dispensing area 120, allowing the oldest stored containers to be accessed before accessing newer stored containers. Storing containers in selectively cascadeable storage units 400 prevents waste that often occurs when storing containers on currently available shelving.

Figure 6:
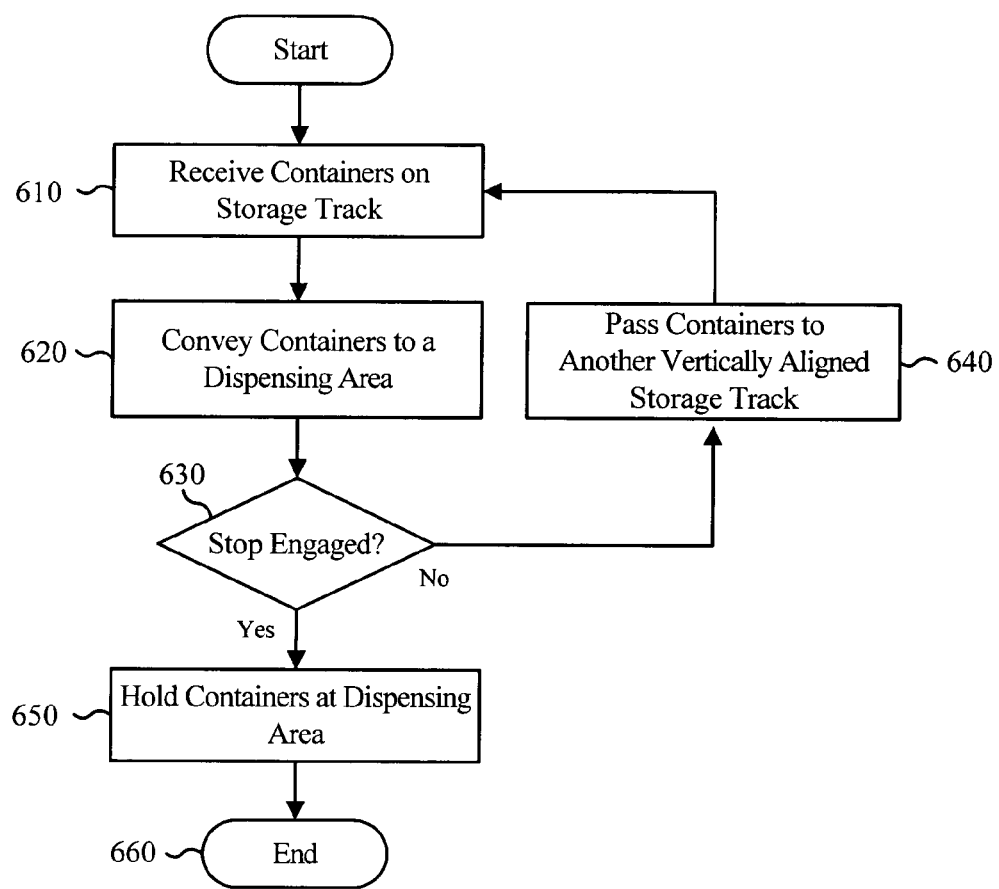
FIG. 6 is a flow chart depicting one embodiment of a container dispensing method of the present invention.

FIG. 6 is a flow chart depicting one embodiment of a container dispensing method 600 of the present invention. The depicted container dispensing method 600 includes a receive containers step 610, a convey containers step 620, a stop engaged test 630, a pass containers step 640, and a hold containers step 650, and an end step 660. The container dispensing method may be conducted in conjunction with, or independent of, selectively cascadeable storage system 100. The container dispensing method 600 facilitates dispensing containers in a selectively cascading FIFO manner and is particular suited for automated storage management.

The receive containers step 610 receives one or more containers from a user or a mechanical device. The method then proceeds to the convey containers step 620 where the containers are conveyed along the storage tracks. At the stop engaged test 630, the container dispensing method 600 determines whether to hold a container at the dispensing area or pass the container on to another receiving area.

If the stop is not engaged, the method proceeds to the pass container step 640. From there the method loops back to the receive containers step 610. However, if the stop is engaged, the method then continues to the hold container step 650 where the container is held on the current storage track. The method ends at the end step 660.

Figure 7:
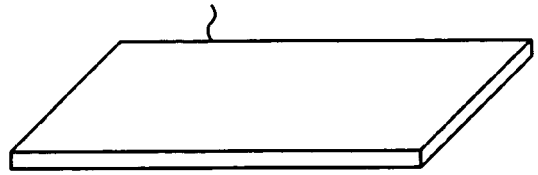
FIG. 7 is a perspective side view illustration depicting selected embodiments of a storage track of the present invention.
Figure 7:
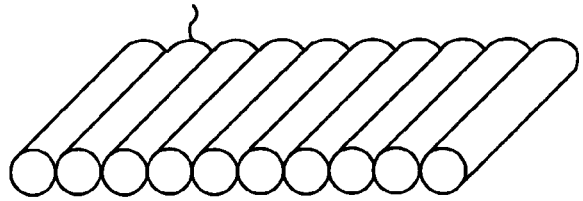
Figure 7:
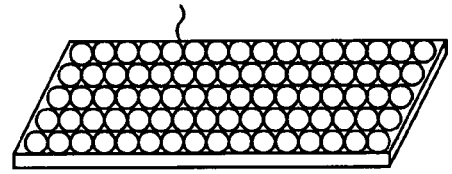
Figure 7:
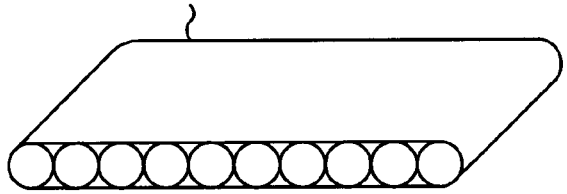
Figure 7:
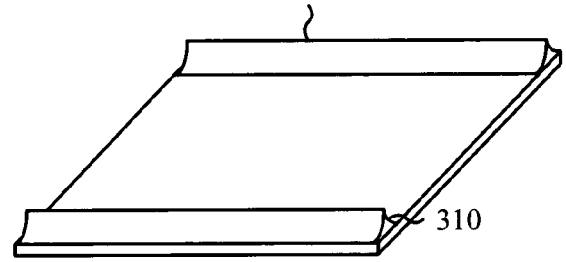

FIG. 7 is a perspective side view illustration depicting certain embodiments of the storage track 700 of the present invention. The depicted storage track 700 embodiments include a shelf storage track 710, a roller storage track 720, a roller storage track 730, a conveyer storage track 740, and a filleted storage track 750. The present invention is thus compatible with multiple types of storage tracks 700, permitting storage of a wide variety of containers.

The shelf storage track 710 is useful for storing cylindrical or nearly cylindrical containers. Roller shelf storage tracks 720 and 730 are useful for storing boxes and the like in addition to cylindrical or nearly cylindrical containers. The rollers on the roller storage tracks 720 and 730 facilitate rolling boxes, sacks, and the like from storage track 700 to storage track 700. The conveyer storage track 740 facilitates rolling boxes, sacks and the like from track to track.

The filleted storage track 750 provides a low-friction surface for efficient rolling of cylindrical containers. Containers rolling on the filleted storage track 750 may contact the filleted storage track 750 exclusively on the fillets. By rolling exclusively on the fillets, the containers encounter minimal friction and thus roll efficiently along the filleted storage track 750.

Figure 8:
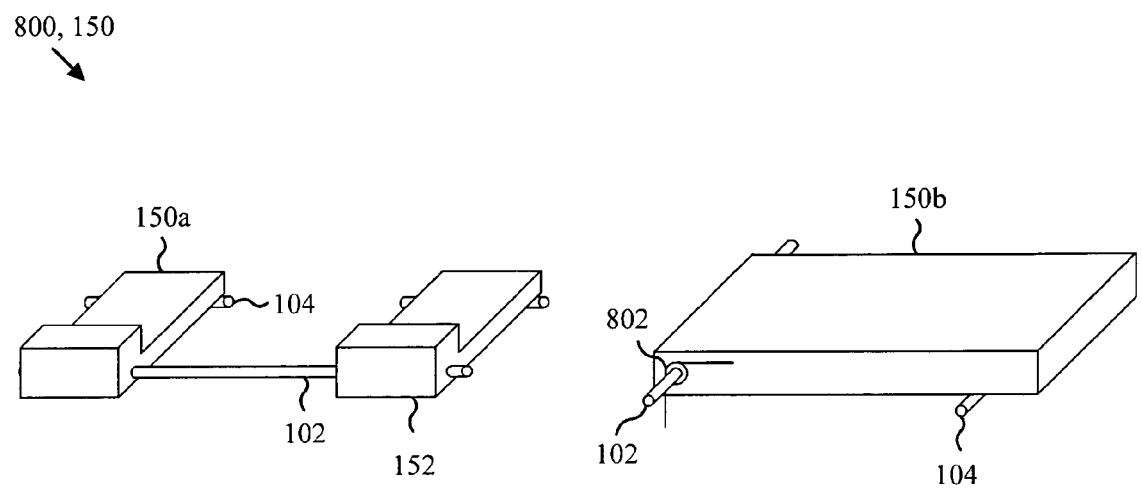
FIG. 8 is a perspective side view illustration depicting selected embodiments of a selectively engageable stop of the present invention.

FIG. 8 is a perspective front view illustration depicting two embodiments of the selectively engageable stop 800 of the present invention, namely, the slat stop 150*a* and the spring-loaded stop 150*b*. The slat stop 150*a* includes one or more slats 152, a hinge pin 102, and one or more engagement pins 104.

The spring-loaded stop 150*c* includes a hinge pin 102, one or more engagement pins 104, and one or more springs 802 that enables gentle lowering of containers to a storage track below them. The slat stop 150*a* may also be configured to include one or more springs 802, so that the slat stop 150*a* can also gently lower containers to a lower storage track.

Figure 9:
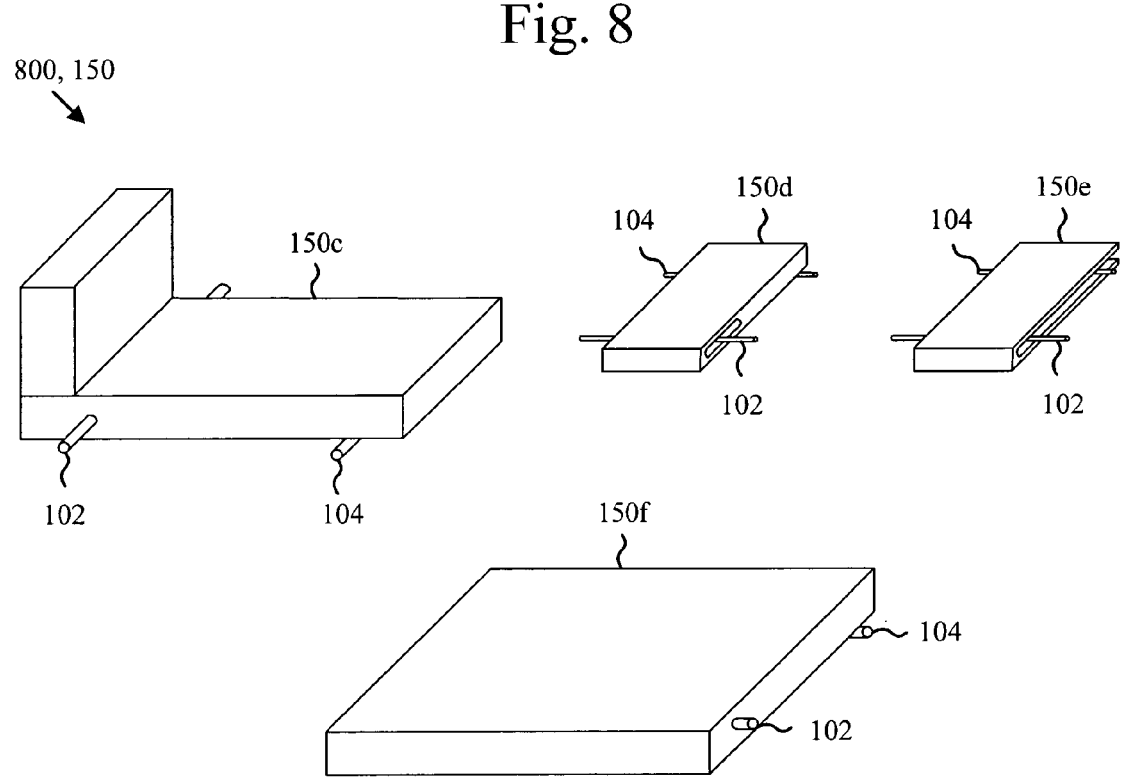
FIG. 9 is a perspective front view illustration depicting additional selected embodiments of the selectively engageable stop of the present invention.

FIG. 9 is a perspective side view illustration depicting further embodiments of the selectively engageable stop 800 of the present invention. The depicted embodiments of the selectively engageable stop 800 include the counterbalanced stop 150*c*, the hollow panel stop 150*d*, the open-ended stop 150*e*, and the panel stop 150*f*. Though not shown, all of the selectively engageable stops 800 may also include one or more springs 702 for gently lowering containers to lower storage tracks.

The counterbalanced stop 150*c*, hollow panel stop 150*d*, open-ended stop 510*e*, and the panel stop 150*f* each may include a hinge pin 102 and one or more engagement pins 104. The engagement pins 104 may be actuated by manual, electronic, or mechanical devices. The hollow panel stop 150*d* may engage or disengage by sliding along the hinge pin 102 through the cavity of the hollow panel. Similarly, the open-ended stop 150*e* may slide along the hinge pin to disengage from the engagement pin 104.

Figure 10:
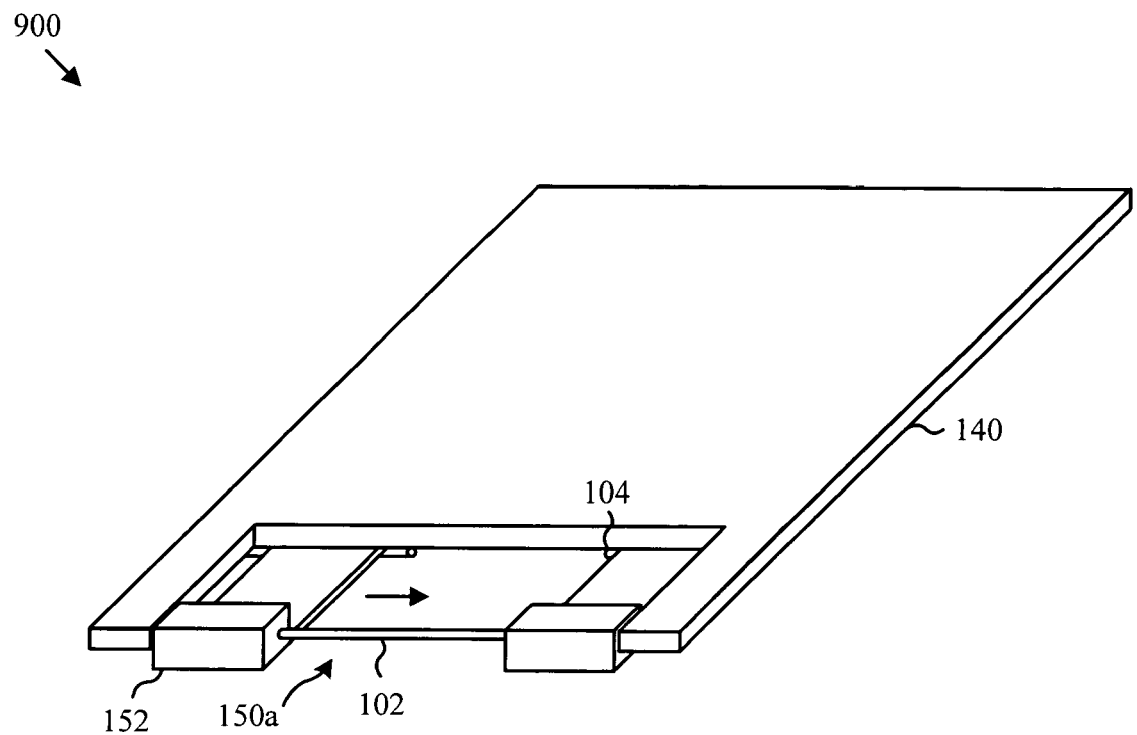
FIG. 10 is a perspective front view illustration depicting one embodiment of the storage track and selectively engageable stop of the present invention.
Figure 10:
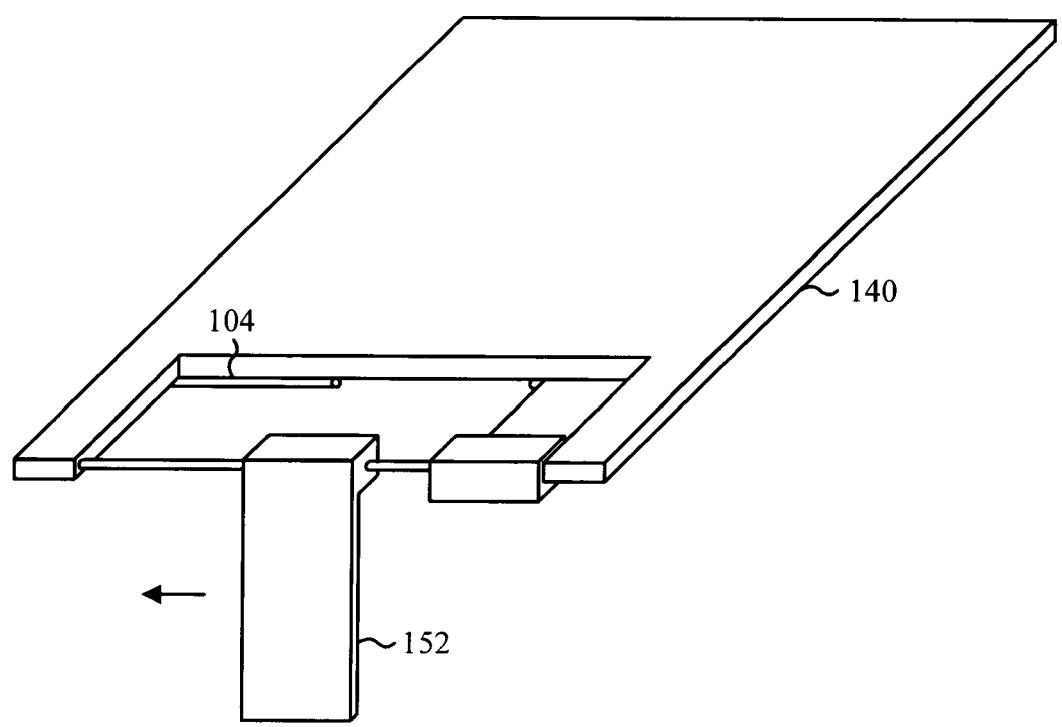

FIG. 10 is a perspective front view illustration depicting one embodiment of a integrated storage track and stop 900 of the present invention. The depicted integrated storage track and stop 900 include a hinge pin 102, one or more engagement pins 104, a storage track 140, a slat stop 150*a*, and one or more slats 152. The depicted storage track 140 may also include fillets (not shown) for passing containers on a low-friction surface.

In the depicted embodiment, the hinge pin 102 is attached to the storage track 140, coupling the slat stop 150*a* to the storage track 140. The aforementioned coupling facilitates attaching the storage track 140 and the slat stop 150*a* to the track height adjustment members 170*a* depicted in FIGS. 1 and 3.

Arrows in the illustration indicate directions of travel of the slat 152 in order to disengage the slat stop 150*a* from the engagement pin 104. From an engaged position, the slat 152 first moves towards the center of the storage track 140. Once in the center, the slat 152 falls off the engagement pin 104. The slat may then be moved from the center of the storage track 140 to the side of the storage track, where it acts as a ramp for passing containers to a lower storage track 140.

Figure 11:
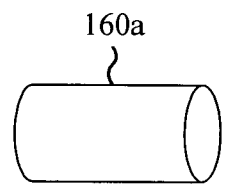
FIG. 11 is a perspective side view illustration depicting various containers usable with the present invention.
Figure 11:
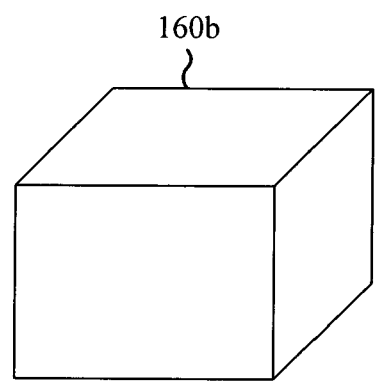
Figure 11:
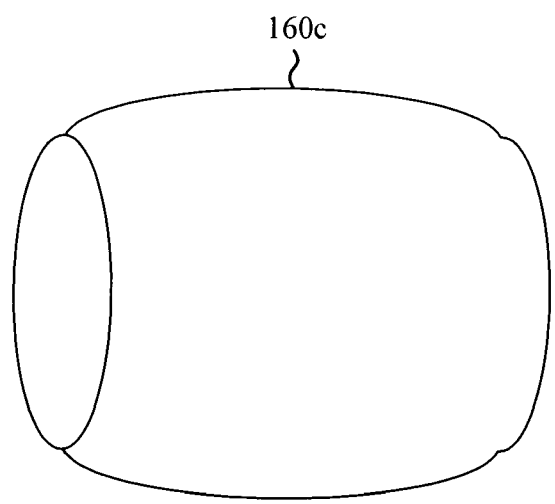
Figure 12:
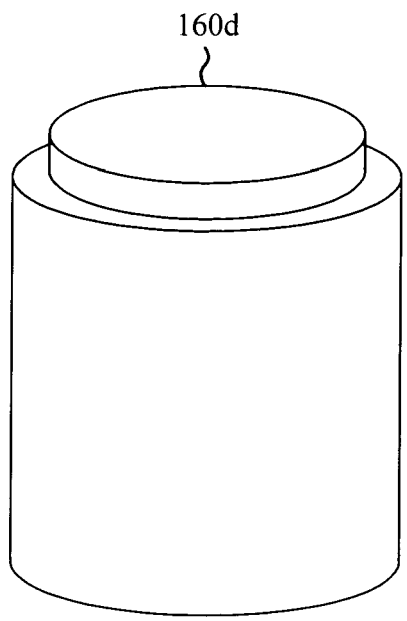
FIG. 12 is a perspective side view illustration depicting further embodiments of the containers of the present invention.
Figure 12:
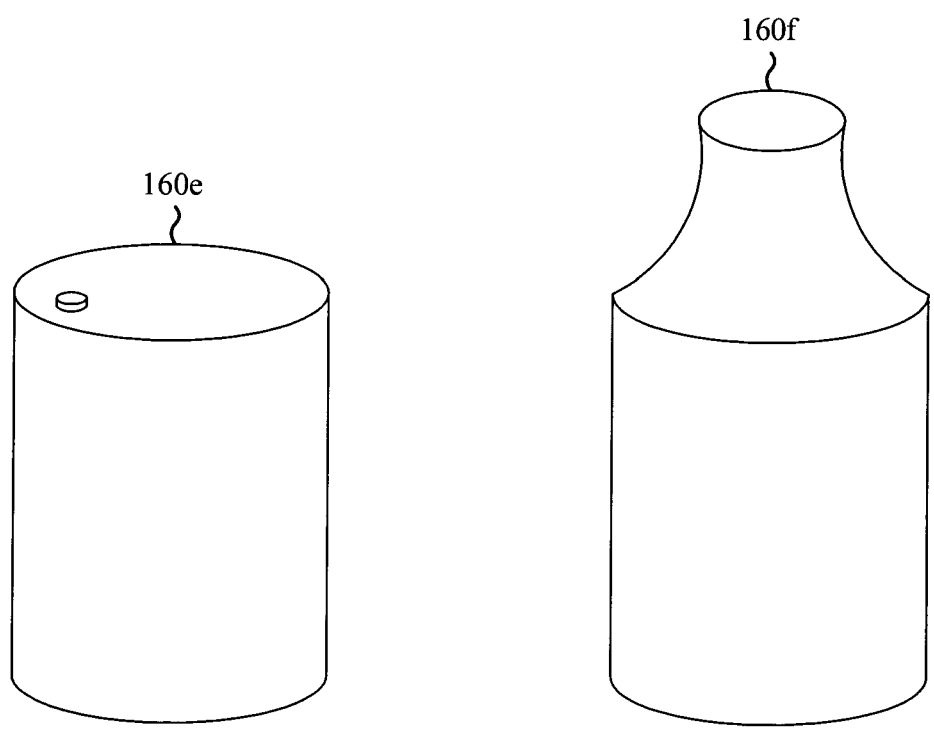

FIGS. 11 and 12 are perspective side view illustrations depicting embodiments of containers 160 in accordance with the present invention. The containers 1000 include a can 160*a*, a box 160*b*, a barrel 160*c*, a jar 160*d*, a drum 160*e*, and a bottle 160*f*. Not shown but also included as containers 1000 are cartons, casks, crates, kegs, packages, sacks, tins, tubs, and the like. By storing various embodiments of containers 160, the selectively cascadeable storage system 100 is useful for a variety of applications, including part inventory management and food inventory management.

Figure 13:
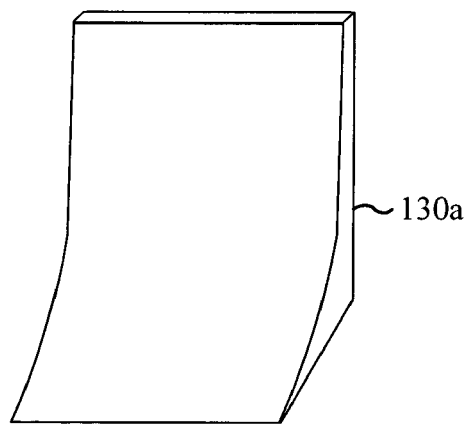
FIG. 13 is a perspective side view illustration depicting embodiments of redirection members of the present invention.
Figure 13:
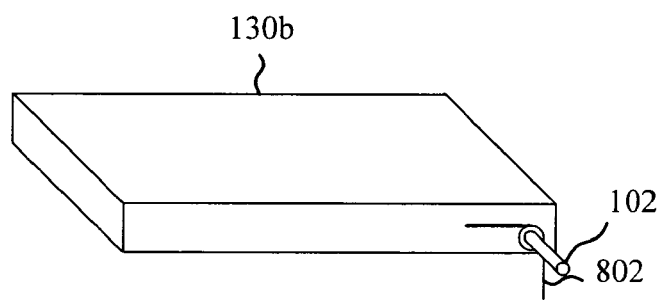
Figure 13:
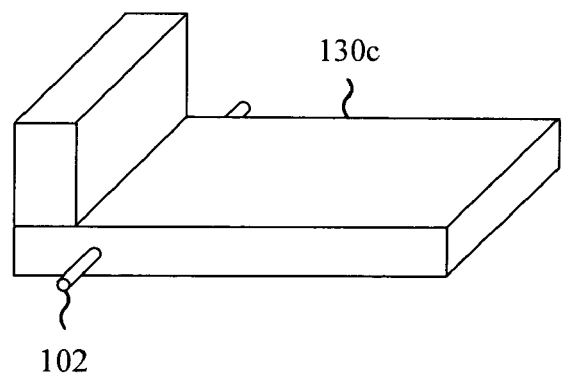

FIG. 13 is a set of perspective view illustrations depicting various embodiments of redirection members 1100 of the present invention. The redirection members 1100 include a curved redirection member 130*a*, a spring-loaded redirection member 130*b*, and a counterbalanced redirection member 130*c*. Redirection members 1100 enable containers to pass smoothly from one storage track to the next. The spring-loaded redirection members 130*b* and the counterbalanced redirection members 130*c* facilitate gently lowering containers from a higher storage track to a lower storage track, preventing damage to the containers.

In addition to spring-loading and counterbalancing mechanisms, both the selectively engageable stops 800 and the redirection members 1100 may include damping mechanisms, such as hydraulic or pneumatic devices. These damping mechanisms may operate independently of, or complementary to the spring-loaded and counterbalance mechanisms.

Figure 14:
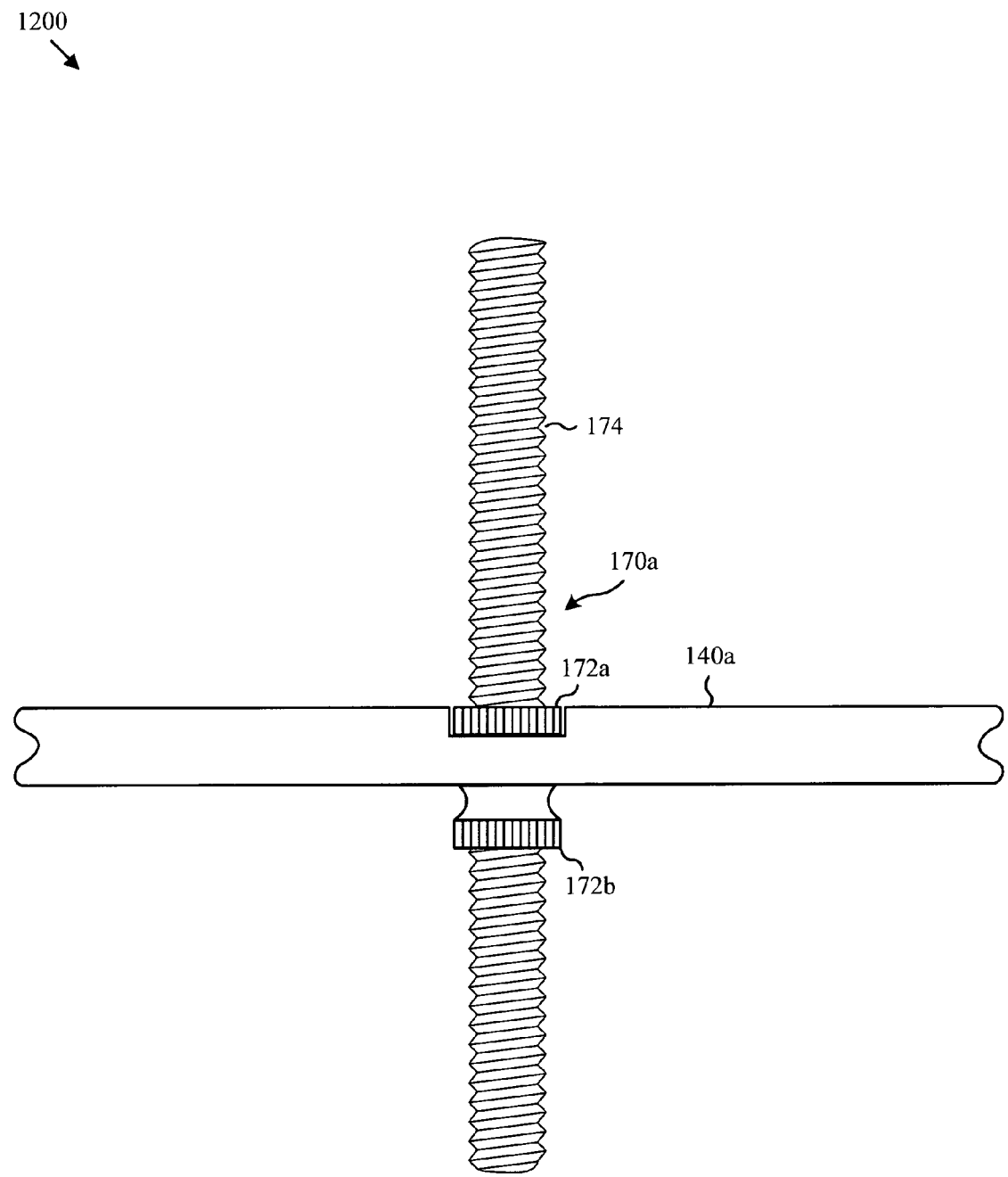
FIG. 14 is a side view illustration depicting one embodiment of a track height adjustment member of the present invention.

FIG. 14 is a side view illustration depicting one embodiment of the track height adjustment member 170*a* of the present invention. The depicted track height adjustment member 170*a* includes a track support member 172*a*, a track support member 172*b*, and a threaded rod 174. In the illustration a storage track 140 is attached to the track height adjustment member 170*a*.

In the depicted embodiment, the track height adjustment member 170*a* holds the storage track 140 at a desired height and incline. Track support members 172*a* and 172*b* fasten the storage track 140 to the track height adjustment member 170*a* by turning about the threaded rod 174 until tightened against the storage track 140. In the illustration, the track support members are hand-tighten nuts, permitting quick and easy adjustment of the storage track 140 height.

The present invention increases the usage of storage systems by facilitating dynamic adjustment of the amount of storage dedicated to a particular inventory item. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An adaptable storage unit for dispensing containers in a selectively cascading first-in, first-out manner, the storage unit comprising:
   a receiving area configured to receive containers;
   a user-accessible dispensing area configured to provide containers;
   a storage track configured to convey containers from the receiving area to the dispensing area; and
   a selectively engageable stop positioned proximate the user-accessible dispensing area, the selectively engageable stop configured to pass containers from the dispensing area to another storage unit if the selectively engageable stop is disengaged.

2. The unit of claim 1, wherein the selectively engageable stop is further configured to hold containers at the dispensing area if the selectively engageable stop is engaged.

3. The unit of claim 1, wherein the selectively engageable stop is further configured to redirect containers from the dispensing area to a storage track of a cascaded storage unit.

4. The unit of claim 1, wherein the receiving area and the dispensing area are arranged such that the dispensing area of a first stacked storage unit substantially overlaps with the receiving area of a second stacked storage unit.

5. The unit of claim 1, wherein the storage track is configured to convey specific containers selected from the group consisting of barrels, bottles, boxes, cans, cartons, casks, crates, drums, jars, kegs, packages, sacks, tins, and tubs.

6. The storage unit of claim 1, wherein the storage track comprises a receptor track member configured to convey containers from the receiving area and a provider track member configured to convey containers to the dispensing area.

7. The storage unit of claim 6, further comprising a redirection member configured to redirect containers from the receptor track member to the provider track member.

8. The storage unit of claim 6, wherein at least one of the track members is nearly horizontal.

9. The storage unit of claim 6, wherein at least one of the track members is selected from the group consisting of a shelf, a conveyer belt, and rollers.

10. The storage unit of claim 6, wherein at least one of the track members comprises at least one fillet.

11. The storage unit of claim 1, wherein the selectively engageable stop comprises a member selected from the group consisting of a slat, a panel, a pin, and a latch.

12. The storage unit of claim 1, wherein the selectively engageable stop is removable.

13. The storage unit of claim 1, wherein the selectively engageable stop is pivotally attached to the storage track.

14. The storage unit of claim 1, wherein the selectively engageable stop is electronically actuated.

15. The storage unit of claim 1, wherein the selectively engageable stop further comprises a spring.

16. The storage unit of claim 1, wherein the selectively engageable stop is counter balanced.

17. The storage unit of claim 1, further comprising at least one track height adjustment member configured to adjust the height of the storage track.

18. The storage unit of claim 17, wherein the at least one track height adjustment member is further configured to hold the storage track in an inclined position.

19. A method for dispensing containers in a selectively cascading first-in, first-out manner, comprising:
  receiving a container on a storage track; and
  holding the container at a user-accessible dispensing area to prevent the container from passing to another storage unit vertically aligned with the storage track if a selectively engageable stop is engaged, wherein the user-accessible dispensing area and the selectively engageable stop are proximate one another.

20. The method of claim 19, further comprising passing the container to another storage unit vertically aligned with the storage track if a selectively engageable stop is disengaged.

21. The method of claim 19, wherein selectively engaging a stop further comprises electronically engaging the stop.

22. The method of claim 19, wherein placing a container on the storage track comprises using a mechanical device to place a container on a track.

23. An adaptable storage unit for dispensing containers in a selectively cascading first-in, first-out manner, the storage unit comprising:
  means for conveying containers to a redirection member;
  means for conveying containers from the redirection member to a user-accessible dispensing area; and
  means for selectively passing containers from the user-accessible dispensing area to another storage unit, wherein the means for selectively passing containers is proximate to the user accessible dispensing area.

* * * * *